(12) United States Patent
Geertshuis et al.

(10) Patent No.: US 7,108,195 B2
(45) Date of Patent: Sep. 19, 2006

(54) PROTECTIVE SHROUD FOR FCC FEED NOZZLES AND METHOD FOR DESIGNING SUCH SHROUD

(75) Inventors: Bernardus Maria Geertshuis, Amsterdam (NL); Jason Andrew Horwege, The Woodlands, TX (US); Ye Mon Chen, Sugar Land, TX (US); Rene Samson, Amsterdam (NL)

(73) Assignee: Shell Oil Company, Houston, TX (US)

( * ) Notice: Subject to any disclaimer, the term of this patent is extended or adjusted under 35 U.S.C. 154(b) by 156 days.

(21) Appl. No.: 10/772,624

(22) Filed: Feb. 5, 2004

(65) Prior Publication Data

US 2005/0173558 A1    Aug. 11, 2005

(51) Int. Cl.
B05B 17/00    (2006.01)
B05B 1/28    (2006.01)

(52) U.S. Cl. .................. 239/1; 239/288; 239/288.3; 239/288.5; 239/597; 239/599; 239/601

(58) Field of Classification Search ................ 239/288, 239/288.3, 288.5, 597, 598, 599, 600, 601, 239/1

See application file for complete search history.

(56) References Cited

U.S. PATENT DOCUMENTS

| | | | |
|---|---|---|---|
| 2,755,137 A | * | 7/1956 | Hughf .................... 239/288.5 |
| 3,533,558 A | | 10/1970 | Masters |
| 3,952,955 A | * | 4/1976 | Clements ................. 239/288.5 |
| 4,025,045 A | * | 5/1977 | Kubiak .................... 239/288.5 |
| 4,434,049 A | | 2/1984 | Dean et al. |
| 5,173,175 A | | 12/1992 | Steffens et al. |
| 5,372,309 A | * | 12/1994 | Ehle et al. ............... 239/288.5 |
| 6,358,041 B1 | | 3/2002 | Whittaker et al. |
| 6,387,241 B1 | | 5/2002 | Murphy et al. |
| 6,503,461 B1 | | 1/2003 | Burgard et al. |

FOREIGN PATENT DOCUMENTS

EP    0593171 B1    9/1996

OTHER PUBLICATIONS

International Search Report for PCT/US2005/003227 of May 11, 2005.
Written Opinion for PCT/US2005/003227 of May 11, 2005.

* cited by examiner

*Primary Examiner*—Steven J. Ganey
(74) *Attorney, Agent, or Firm*—Charles W. Stewart

(57) ABSTRACT

A protective shield for protecting a feed nozzle encloses, not only the circumference of the feed nozzle, but also encloses and protects the end of the feed nozzle. The protective shield includes an open portion in its end which corresponds to, and surrounds the slit in the end of the feed nozzle. Optimal shape of the open portion is determined by spray visualization tests.

8 Claims, 5 Drawing Sheets

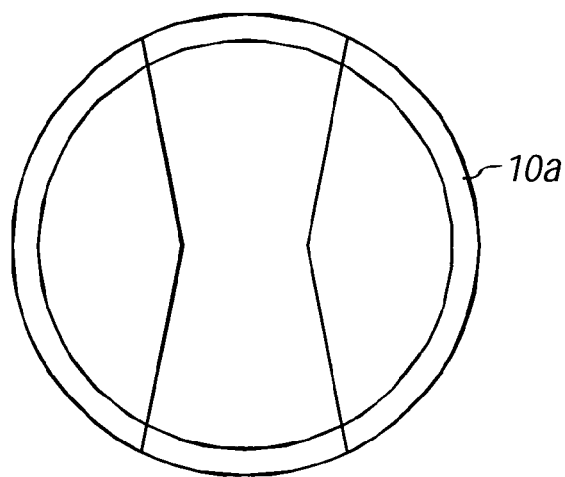
FIG. 1D-A
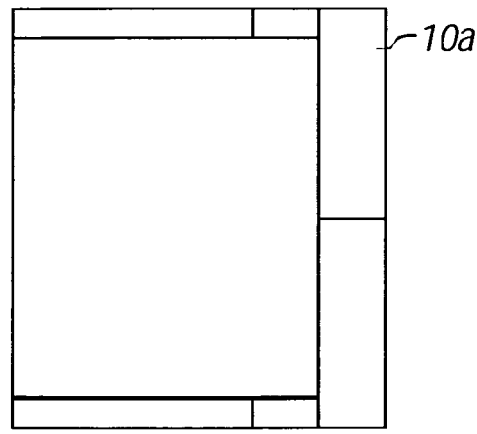
FIG. 1D-B
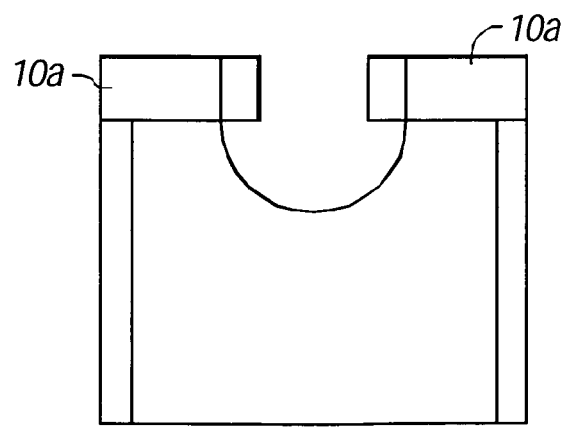
FIG. 1D-C

PROTECTIVE SHROUD FOR FCC FEED NOZZLES AND METHOD FOR DESIGNING SUCH SHROUD

BACKGROUND OF THE INVENTION

1. Field of the Invention

Fluid Catalytic Converter (FCC) feed nozzles and, in particular, protective shrouds for such feed nozzles.

2. Description of Related Art

In some refineries, there is a problem with erosion of feed nozzle oil heads, which are being eroded from impingement of catalyst. The application of shields around feed guns is being practiced in recent years as a means to reduce catalyst erosion attack on the heads of feed guns.

SUMMARY OF THE INVENTION

A protective shield for protecting a feed nozzle encloses, not only the cylindrical circumference of the feed nozzle, but also encloses and protects the front end of the feed nozzle. The protective shield includes an open portion in its end, which corresponds to, and surrounds the slit in the end of the feed nozzle. Optimal shape of the open portion is determined by spray visualization tests.

BRIEF DESCRIPTION OF THE DRAWINGS

FIG. 1D is a drawing of a later shield shown in top, front and side elevation views.

DESCRIPTION OF PREFERRED EMBODIMENTS

A possible solution for protecting feed nozzles is to cover the oil head that is exposed to the catalyst with a refractory-lined protective shield. This shield should be constructed in such a way that it can easily be placed over the nozzle head and, when damaged, removed and replaced.

Applicants believe that a more enclosing cover is needed to withstand catalyst attack. The risk of applying such shields is that they can affect the spray in a way that is deleterious for the performance of the feed nozzle. Tests were carried out to establish that there is no such deleterious influence.

Several different shields of a successively more enclosing nature were constructed and tested. In these tests the spray characteristics of the feed nozzle were measured.

Applicants have concluded that the shields tested have hardly any negative influence on the spray characteristics compared to operating the feed nozzle without the shield.

The following paragraphs describe the tests. In a pilot plant the atomization of hydrocarbons by steam is simulated using water and air (at ambient temperature). The spray can be characterized with the aid of photography, video, impact, and droplet size measurements.

The instruments for droplet size, impact, and liquid flux measurements are placed on a specially designed traversing unit so that the measurements can be carried out at any desired horizontal and vertical position.

Figure 1A:
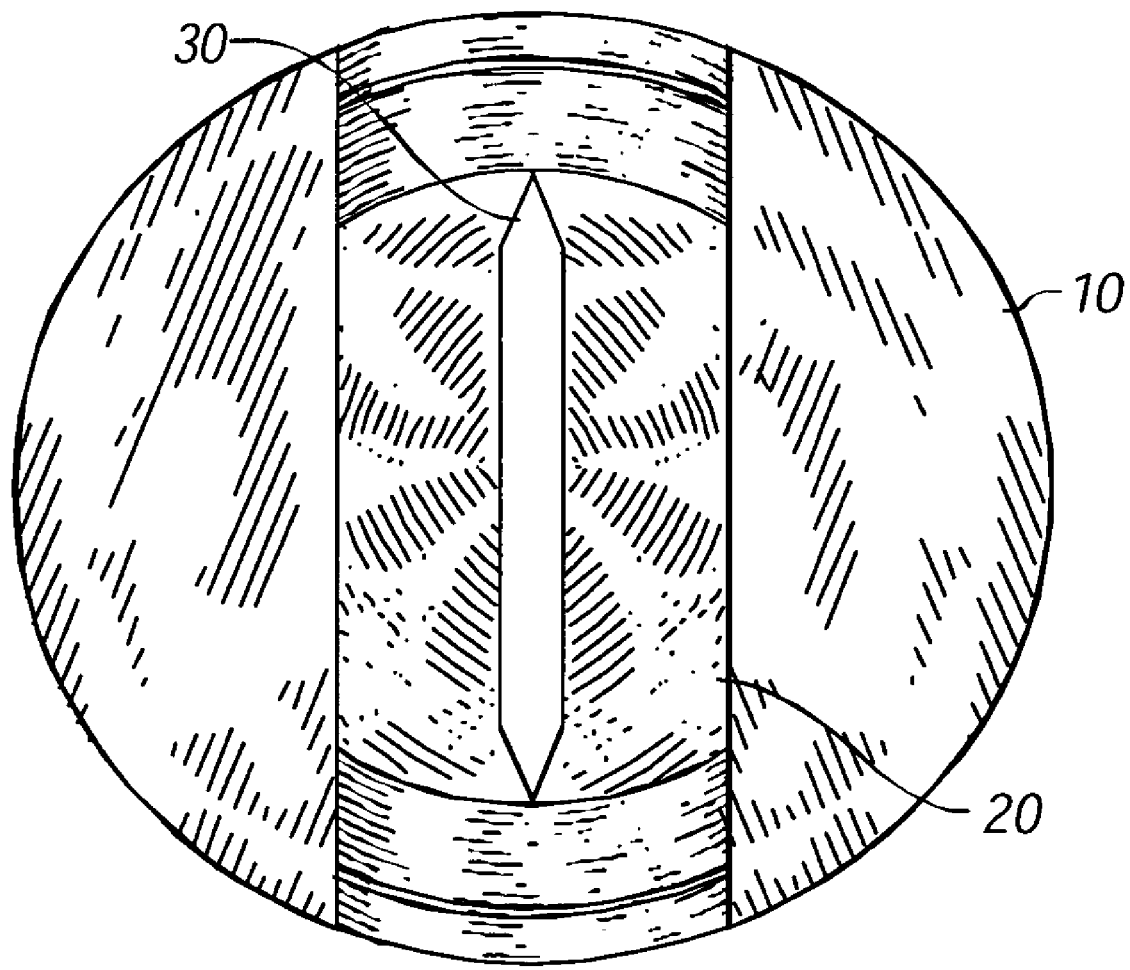
FIGS. 1A, 1B and 1C are isometric views of a shield over an oil head.
Figure 1B:
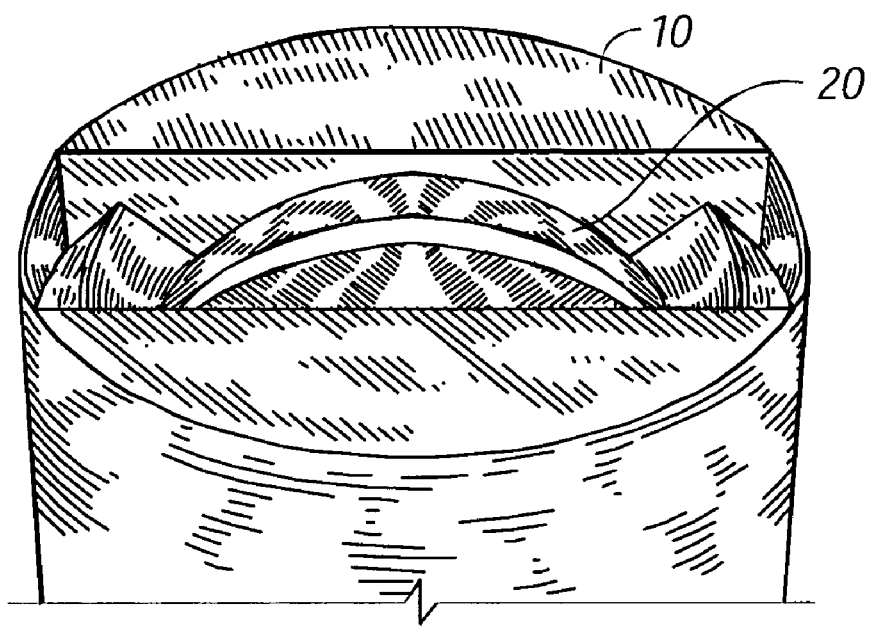
Figure 1C:
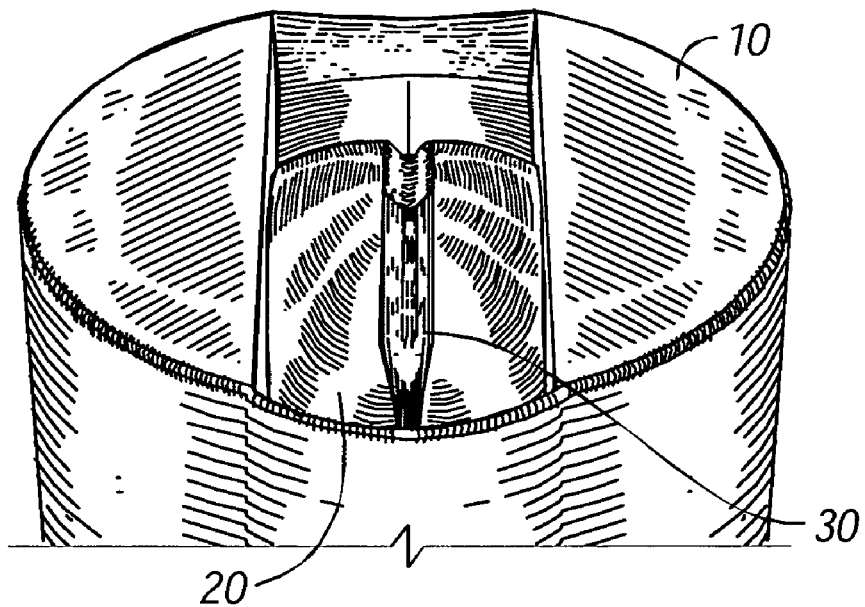

FIGS. 1A, 1B and 1C show isometric views of a first shield 10 placed over an oil head 20. With the shield 10 of FIGS. 1A, 1B and 1C, it was observed that the width of the slit 30 is larger than necessary. This increases the chance that catalyst can reach the unprotected outer surface of the oil head 20. A second shield 10a was constructed as shown in FIG. 1D. The oil head is not shown for clarity.

With the shield 10a of FIG. 1D, it was observed that there is still a big space between the outer edge of the spray and the shield 10a. From these observations, a third shield 10b was constructed as shown in FIG. 2.

Figure 2A:
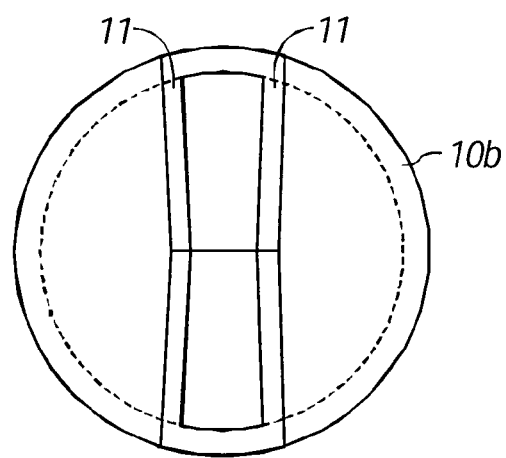
FIG. 2 is a drawing of a shield used in the testing program also shown in top, front and side elevation views.
Figure 2B:
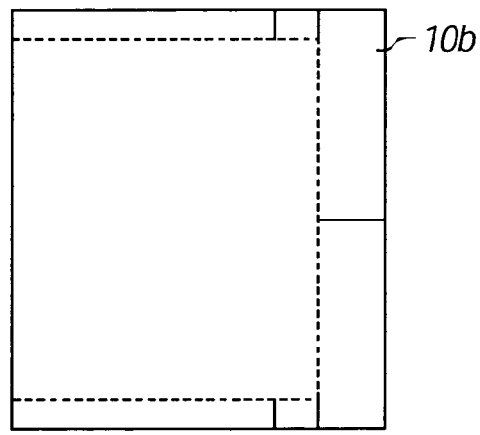
Figure 2C:
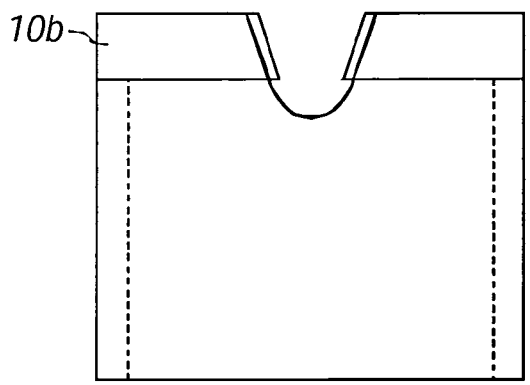
Figure 3A:
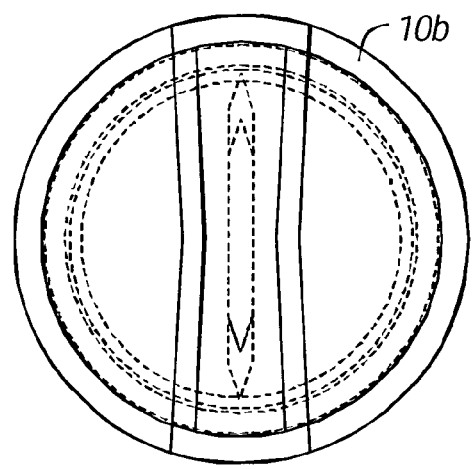
FIG. 3 is a drawing of the shield of FIG. 2 in combination with an oil head also shown in top, front and side elevation views.
Figure 3B:
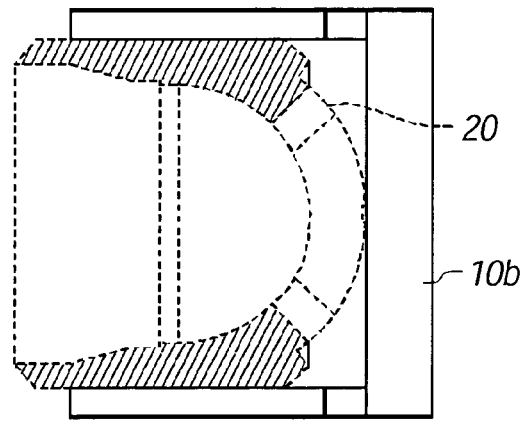
Figure 3C:
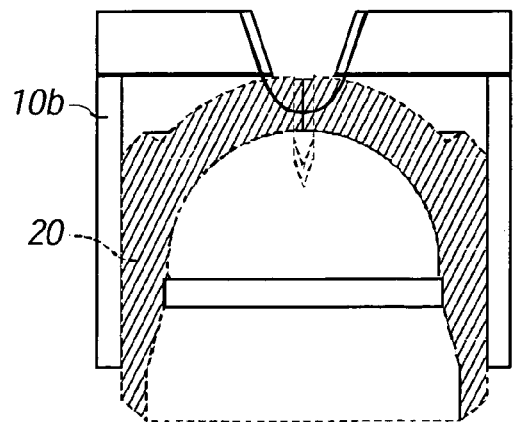

The third shield 10b, shown in FIG. 2 without an oil head, is different from the previous versions in such a way that the sides 11 forming the open portion of the shield 10b are far less open and the open portion tapers upwards and outwards. It was observed that this shield encapsulates the spray on all sides reducing the chance of catalyst impinging on the unprotected oil head 20 (not shown). FIG. 3 shows the Shield 10b of FIG. 2 in combination with an oil head 20.

To determine that the shield 10b does not affect the characteristics of the feed nozzle 20, spray characterization measurements were done with the slit 30 in a vertical as well as a horizontal orientation.

In the third shield 10b of FIG. 3, it was observed that the shield encloses the spray quite well. Also, the outer edge of the space between the shield 10b and the feed nozzle 20 is nicely filled with spray.

It was observed that the spray characteristics do not change significantly if the nozzle 20 is operated with and without the shield 10b.

In order to design a suitable shield around a feed nozzle that is different from the one described herein, one should shape the shield such that it encloses the feed nozzle following the contours of the feed nozzle tip and the spray emerging from the tip such that the walls of the shield make no contact with the spray. In practice this may not be a trivial endeavor if one does not have any idea of the shape of the spray; for example, if one does not know the angle of divergence of the spray. For the sake of prudence, a designer will want to conduct some simple air-water spray tests such as described above. Such tests, even if conducted without sophisticated measuring equipment, and by just using the naked eye to "eyeball" the shape of the spray, will often be sufficient to derive the gap in the shield that is necessary to avoid contact with the spray.

The novel feature of the present invention is that the shroud not only encloses the feed nozzle from the side (as is customary) but also has a top cover, which extends almost all the way up to the slit (the opening through which the spray emerges). When one encloses a spray with such a shield one is not sure "how far one can go". If one makes the fit between shield and spray too tight, the spray will make contact with the shield, which is not desired. If the gap between shield and spray is too large, there is too much room for catalyst to enter, collide with the tip of the feed nozzle and thereby damage it. The point of the tests is to determine just how tightly one can make the shield fit around the spray without the spray making contact with the shield. The shields of FIGS. 1A–1D and FIG. 2 show increasingly tight fits. The shield of FIG. 2 is the best one in terms of tightness of fit without negative interference.

Of course all of this is highly dependent on the form of the spray, which in turn is determined by the internal architecture of the feed nozzle. In that sense the shield disclosed herein is not a "one-size-fits-all" solution. If one would want to cover a different feed nozzle with a shield, one would have to go through a test procedure to find the right solution for that particular feed nozzle.

The ideal condition would be to make this opening so large that at its outer end it is larger than the opening of the slit plus the natural increase in width of the spray incurred in traversing the distance between the slit opening and the outer edge of the shroud. This widening of the spray is dictated by the laws of hydrodynamics and by the shape of the slit. In many practical cases, the natural widening angle is between 5 and 10 degrees. In order to have a more precise number for this, one could undertake spray visualization tests.

The exact sizes of this opening will depend, among other things, on the size and the shape of the orifice through which the spray emerges.

What is claimed is:

1. A protective shield for a feed nozzle for use in an FCC Unit, wherein said feed nozzle incorporates a slit at its dispensing end for dispensing a spray of fluid feed, comprising:
    a shield completely surrounding a cylindrical circumference of said feed nozzle; and,
    an extension of said shield extending around the end of said feed nozzle so as to cover a portion of said dispensing end of said feed nozzle, said extension of said shield having an open portion corresponding to, but larger than, said slit in said feed nozzle; wherein said protective shield includes a refractory-lined portion.

2. The protective shield of claim 1 wherein said open portion is large enough to enclose said spray emerging from said feed nozzle without making physical contact with said spray.

3. The protective shield of claim 1 wherein said open portion is in the shape of a rectangle.

4. The protective shield of claim 1 wherein said open portion is narrower at its longitudinal center and flares outwardly in each direction from said center.

5. The protective shield of claim 1 wherein the longitudinal sides of said open portion include inclined planes in the direction of said slit in said feed nozzle.

6. The protective shield of claim 5 wherein said inclined planes are inclined at an angle of from about 5 degrees to about 10 degrees.

7. A method for protecting a feed nozzle for use in an FCC Unit wherein said feed nozzle has a slit in its end for spraying a fluid feed therefrom, comprising the steps of:
    surrounding a cylindrical circumference of said feed nozzle with a protective shield having a refractory-lined portion;
    enclosing a portion of said end of said feed nozzle with an extension of said protective shield; and,
    forming an opening in said extension wherein said opening in said extension is larger than said slit in said feed nozzle.

8. The method of claim 7 further including the steps of:
    performing spray visualization tests to determine the optimal shape of said opening in said extension; and,
    forming said determined optimal shape in said opening.

* * * * *